United States Patent [19]

Kinkelin

[11] Patent Number: 5,122,632
[45] Date of Patent: Jun. 16, 1992

[54] DEVICE FOR LASER PLASMA COATING

[76] Inventor: Konrad Kinkelin, 19, Rue des Roses, F-69100 Villeurbanne-Cedex, France

[21] Appl. No.: 598,537

[22] Filed: Oct. 16, 1990

[30] Foreign Application Priority Data

Oct. 20, 1989 [DE] Fed. Rep. of Germany ....... 3935009

[51] Int. Cl.$^5$ ............................................. B23K 26/00
[52] U.S. Cl. ........................... 219/121.63; 219/121.84; 427/53.1
[58] Field of Search ...................... 219/121.84, 121.63, 219/121.64, 121.6, 121.85, 121.65, 121.66; 427/53.1

[56] References Cited

U.S. PATENT DOCUMENTS 4,804,815  2/1989  Everett .............................. 219/121.6
4,814,575  3/1985  Petitbon ........................... 219/121.64

Primary Examiner—C. L. Albritton

[57] ABSTRACT

In laser plasma coating, the feeding of the material to be applied is unsatisfactory. Too much material is blown away and not used for the coating. Moreover, the application is inhomogeneous, depending upon the direction in which the laser beam is moved. According to the invention, the material is introduced at an angle coaxial with the laser beam and the angular momentum is then braked at the latest at the position where the powder leaves the feed head.

24 Claims, 3 Drawing Sheets

DEVICE FOR LASER PLASMA COATING

The invention relates to a device for coating surfaces of materials using the energy of a power laser having a geometric longitudinal axis, in which a laser beam radiates. The device has a focal spot which is traversed by the geometric longitudinal axis and in the region of which a material to be processed can be arranged, and a feeding device, by which powder can be brought into the region of the focal spot by means of a transport gas.

BACKGROUND OF THE INVENTION

Devices are apparently known, in which powder is fed to the region of the focal spot by means of a transport gas. However, the powder is applied in a manner displaced anyhow in relation to the geometric longitudinal axis, so that not all of the volume of powder is exposed to the same process conditions during the coating. This results in inhomogeneities. Depending on whether the device—and thus the laser beam—moves forwards, backwards, sideways or the like, the results of the operation are different. If, for example, a type of blast pipe were used as the feeding device, then this pipe must blast obliquely in relation to the geometric longitudinal axis. This leads to preferred directions of the applied coating, which are unfavorable. If an annular nozzle were provided around the geometric longitudinal axis, then the laser beam is, so to speak, enveloped by the powder. In this case, only the lagging powder then passes into the laser beam. In this case, the leading or laterally fed volume of powder undergoes an entirely different treatment, or possibly even no treatment whatsoever.

A further disadvantage is that the loss of powder is relatively great, as it is blown away without having been deposited as a coating on the surface.

SUMMARY OF THE INVENTION

The object of the invention is to overcome the above designated disadvantages and to use the laser beam, so to speak, as a brush to apply the powder.

According to the invention, this object is achieved by the following features:

a) A head is arranged around the geometric longitudinal axis and in front of the focal spot, which head transmits the laser beam in the direction of the geometric longitudinal axis and has an entrance region and an exit region for the laser beam, b) The head has a central interior space arranged around the geometric longitudinal axis, c) In the exit region, the interior space has a coaxial aperture, which is slightly larger than the diameter of the laser beam, d) In the entrance region of the interior space there is provided at least one inlet nozzle for transport gas, which nozzle emits into the interior space, and e) The inlet nozzle is arranged with an at least predominantly tangential component relative to the interior space.

At least a large part of the volume of the gas-borne powder is now, at the same time, also situated within the cross section of the laser beam. In terms of order of magnitude, a typical area is 10 mm². Depending upon the fineness of the laser beam, the area may, of course, be smaller or larger by up to a factor of 10. The area does not necessarily need to be the content of a circle. Rather, this area may also be the content of an ellipse. It is also possible to focus the laser beam so that it has a width substantially greater than its thickness, so that it is equivalent to a paint brush. It is then also necessary for the coaxial aperture to be correspondingly shaped. The powder employed may be, for example, ceramic powder or metal powder. The use of other types of powder is also possible. Moreover, it is possible to use mixtures of types of powder. In the case of ceramic powder in particular, the grain size may be as low as 1 μm. For many applications, the use of a powder which is as fine as possible is recommended, which powder may even be designated as dust. By the invention, it is possible to coat the most widely varying substances such as, for example, metal, ceramic, organic glass, plastic, wood, biocompatible substances (for example, the load-bearing sliding surfaces of artificial joints such as hips, knee or the like). It has become evident that, using the invention, it is possible to produce from the powder particles "walls" which are, for example, 0.5 mm wide and have a height six to seven times greater than their width. These are formed on the workpiece only where the laser beam is. In this way, it is possible to produce printing plates for the printing industry. It is possible to produce printed circuit boards. It is possible to produce three-dimensional surfaces. It is possible to apply coatings of other substances to aluminum. It is possible to coat hitherto uncoatable substances. Inorganic glass and stone are also, in any event, coatable.

A vortex formation is achieved. The vortex is concentrated towards the geometric longitudinal axis, i.e. to where the laser beam is situated, so that the latter sees the powder already at a very early stage and can possibly heat it. This does, of course, depend upon the reflectance of the powder. Furthermore, a more homogeneous flow of powder is obtained over the cross section through the coaxial aperture, as well as an improved mixing, should this be necessary. The following additional advantageous features are disclosed in the described embodiments.

The interior space has oblique walls falling away towards the coaxial aperture. By this feature, it is achieved that the carrier gas and thus the powder are concentrated towards the coaxial aperture and the powder is better mixed on account of the never entirely laminar flow.

At least in essential regions, the walls form a coaxial circular cone, the angle of which is greater than the angle of repose of the powder. By this feature, it is achieved that no powder is deposited in the interior space.

Inlet nozzles are provided in a number corresponding to the types of component of the powder. By this feature, improved possibilities for mixing are achieved. The speed of the transport gas can be adapted to the properties of the powder.

An angular momentum brake is provided for a vortex generated by the transport gas and the inlet nozzle is provided in the interior space. By this feature, the powder or the dust is prevented, to a considerable extent, from being flung outwards, which the angular momentum per se would involve.

The angular momentum brake has a setting in which the angular momentum in the coaxial aperture is in the region around zero. By this feature, the transport gas and thus the powder or the dust does not fan out towards the coaxial aperture virtually any more, or does so only to the desired extent.

The angular momentum brake has a setting in which the angular momentum in the coaxial aperture is zero. By this feature, after leaving the coaxial aperture the transport gas maintains the geometry imposed on the latter. Thus, if the aperture is circular, then the cross section of the transport gas remains circular. If the cross section is rectangular, then the cross section of the transport gas remains rectangular and so on.

The angular momentum brake comprises gas guide surfaces at least in the region in front of the coaxial aperture. By this feature, a passive angular momentum brake is achieved.

The gas guide surfaces are the flanks of grooves.

The gas guide surfaces are the flanks of guide ribs. By these features, it is possible in a simple manner to produce guide surfaces which do not obstruct the laser beam, but which reduce or—depending upon the particular shaping—eliminate the angular momentum.

The flanks extend parallel to the geometric longitudinal axis. By this feature, straight guide surfaces are obtained, which can be produced accordingly in a simple manner.

The flanks are arranged in a spiral contrary to the sense of or in the same sense as the twist of the vortex caused by the angular momentum. By these features, it is possible to generate the back twist effectively on a short spiral path.

The angular momentum brake is an upstream angular momentum generator, the angular momentum of which is oppositely directed to the angular momentum of the device. By this feature, a particularly simple active angular momentum brake is achieved, which for its part can be monitored and controlled in its action, even during operation.

Means are provided for feeding powder of differing materials together with one another.

The materials can be differing metals. The materials can be differing metal oxides. The materials can be plastic and ceramic. The materials can be metal and ceramic. The materials can be plastic and metal. One of the materials can predominate in relation to the other in terms of quantity. More than two materials can be fed together with one another. Hard metal powder and ceramic powder can be mixed.

DESCRIPTION OF THE DRAWINGS

The invention is now described with reference to preferred illustrative embodiments.

In the drawing.

DESCRIPTION OF PREFERRED EMBODIMENTS

Figure 1:
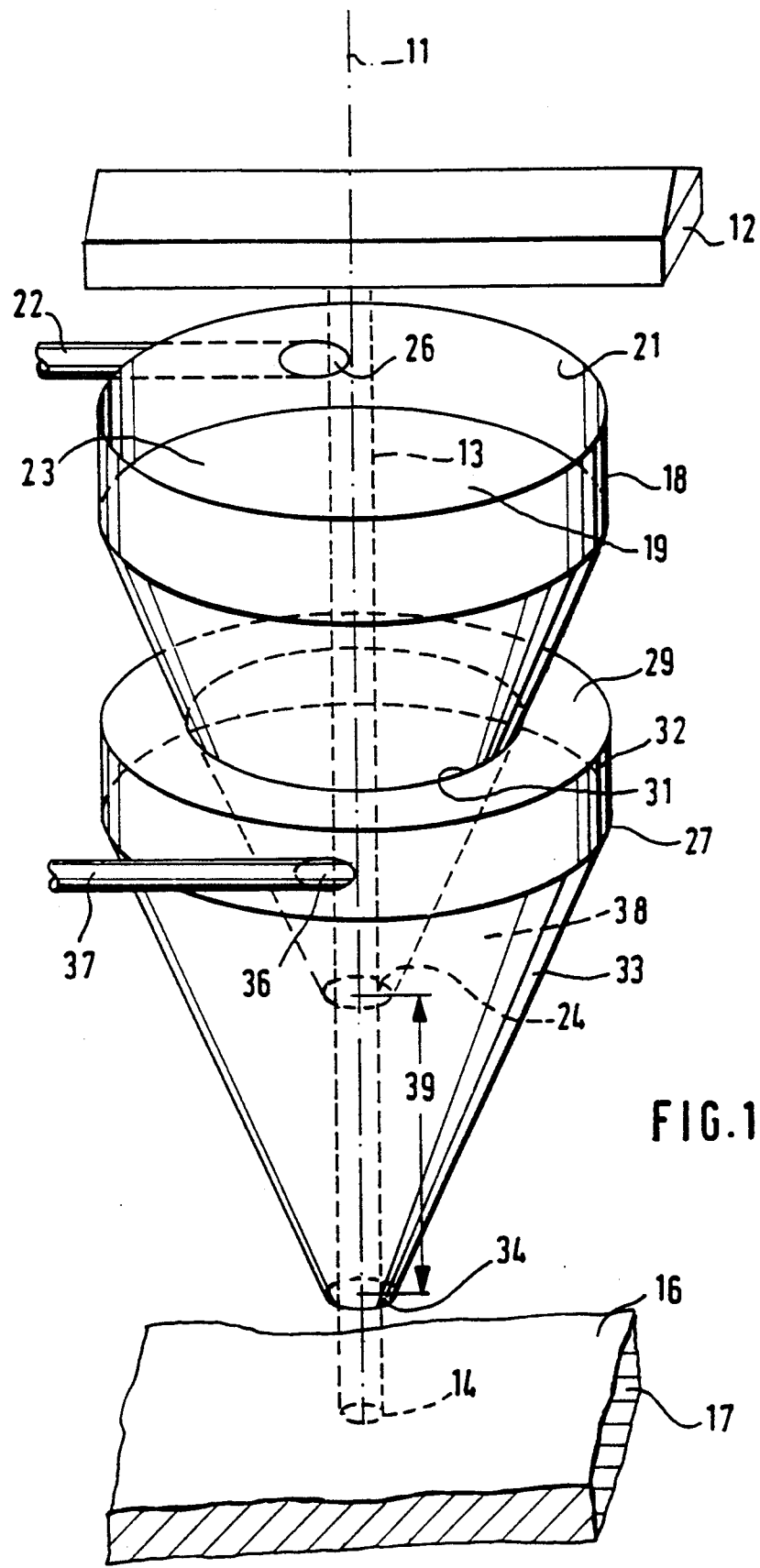
FIG. 1 shows a diagrammatic representation of the invention, combined with an active angular momentum brake.

Along a geometric longitudinal axis 11, a laser (now shown) emits a beam downwards. In this case, the beam passes through an optical system 12, which may be a lens arrangement and/or a mirror arrangement. The laser beam is concentrated in the optical system 12. In this illustrative embodiment there is then a beam 13, which generates at the bottom a circular focal spot 14, for example having a radius of 2 mm. This focal spot is situated above the surface 16 of a workpiece 17 to be coated. The position of the focal spot 14 above or at most in the surface 16 is preferred as against the former position below the surface 16. Beneath the optical system 12 an angular momentum generator 18 is provided, in a similar way to the angular momentum generators derived from German Patent Application P 39 18 363.7 of Jun. 6, 1969. The angular momentum generator 18 used here has an interior space 19, the circular-cylindrical wall 21 of which is coaxial with the geometric longitudinal axis 11. A conduit 22 for protective gas opens tangentially into it. In a downward direction, the circular-cylindrical wall 21 continues into a circular-conical wall 23, which is likewise impermeable to gas and coaxial with the geometric longitudinal axis 11. No gas or only a small quantity of gas can escape out of the interior space 19 in an upward direction. This is so on account of additional measures which are not of interest here. At the bottom, the circular-conical wall 23 has a coaxial, circular aperture 24. The mouth 26 and the tangential direction of the conduit 22 are such that in the interior space 19 a gas vortex can be formed, which rotates, for example, clockwise. As is known, the angular momentum is constant over the cross section. Since the radius becomes progressively smaller, as the gas approaches more closely to the geometric longitudinal axis 11, its speed of rotation there must be quite substantially greater than at the mouth 26, so that—the closer is the approach to the aperture 24—the speed of rotation increases progressively further. As a result of friction it is not, of course, infinite in the geometric longitudinal axis 11. One of the functions of the angular momentum generator 18 is to keep particles flying off from the surface 16 away from the optical system 12. According to the previously mentioned application, these particles flying off are flung by the vortex outwards against the circular-conical wall 23, or at the latest against the circular-cylindrical wall 21, and cannot burn into the optical system 12 and thus cannot cause any damage.

A further active angular momentum generator 27 is connected downstream of the angular momentum generator 18. The latter generates an angular momentum in the opposite sense to the angular momentum generator 18, i.e. counterclockwise. It has a coaxial cover ring 29, which stands perpendicular to the longitudinal axis 11 and in the interior aperture 31 of which the wall 23 sits by its lower region, so that it partly projects into the angular momentum generator 27. The connection between the cover ring 29 and the angular momentum generator 18 is gastight.

In a downward direction, the cover ring 29 merges in a gastight manner into a coaxial, circular-cylindrical wall 32. The latter is continued in a downward direction in a gastight manner into a circular-conical wall 33. The latter has, at the bottom, a coaxial circular aperture 34, which is at least of such a size that the beam 13 does not graze. The aperture 24 is coaxial with the geometric longitudinal axis 11. By a mouth 36, a conduit 37 opens in the circular-cylindrical wall 32 and thus in the interior space 38 of the angular momentum generator 27. The conduit 37 together with the mouth 36 is arranged so that gas blown in generates an angular momentum in the opposite sense to the conduit 22. The conduit 37 is—just like the conduit 22—connected to an inert gas source, for example a noble gas source, which is under pressure. In addition, the conduit 37 is connected at least indirectly to a powder container and/or a dust container, which contains the material necessary for the coating. There is a considerable spacing 39 between the apertures 24, 34. The spacing between the aperture 34 and the mouth 26 is in the range of several centimeters, for example four to seven centimeters.

In operation, the laser is activated, so that the beam 13 is present. Inert gas is blown in through the conduit 22. A vortex then emerges in a downward direction out of the aperture 24. An inert gas is likewise blown in through the conduit 37, which inert gas carries with it powder or dust of the desired type. There is now created in the interior space 38 a vortex which is directed counter to the previous one and the development of which is further promoted by the circular-conical wall 23, to the extent that it is situated in the interior space 38. Below the aperture 24, the vortex which comes from right above and which rotates to the right meets the vortex, rotating to the left, of the interior space 38. Along the spacing 39 the angular momentum gradually becomes zero, so that at least in the aperture 34 there is a predominantly axial flow along the geometric longitudinal axis 11 of a cross section which is determined by the geometry of the aperture 34. If the aperture 34 is circular, then the powder and/or the dust is blown out in a circular-cylindrical configuration. If the aperture 24 is elliptical, then the dust and/or the powder emerges in the form of an elliptical "rod". If the aperture 34 is elongate-rectangular, then similar considerations are applicable. In this case, for example, it is expedient to concentrate the beam 13 in such a manner that it itself has a rectangular form.

On the path of the spacing 39 and also below the aperture 34, the beam 13 impinges on dust and/or powder grains and heats these—in a manner depending upon their absorption behaviour. It can be arranged so that the dust and/or powder grains cake entirely or partially along the spacing 39. If these cake together or fuse together into small lumps, their weight/surface ratio becomes greater, so that they are deflected less easily from their axial path by the diverging carrier gas and thus impinge on the workpiece 17 closer to the geometric longitudinal axis 11. At the focal spot 14 the powder and/or the dust comes to the temperature required for the coating, so that the coating layer influences the surface 16. This influencing can take place in that the coating layer covers the surface 16 and/or forms a "wall" and/or produces a surface alloy with material of the workpiece 17, if the material is suitable for this.

Figure 2:
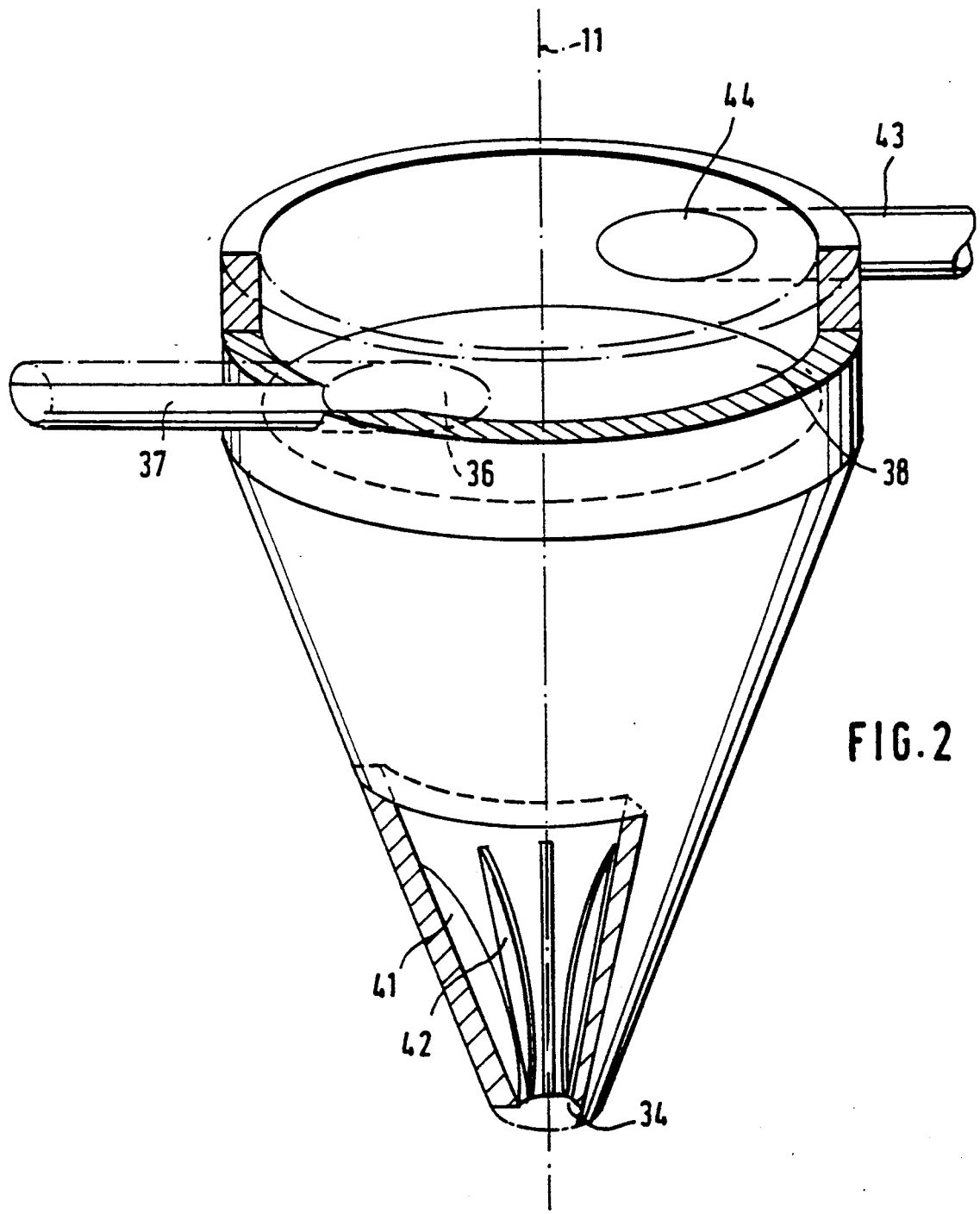
FIG. 2 shows the diagrammatic representation of a device according to the invention, partially broken away, with a passive angular momentum brake.

In the illustrative embodiment according to FIG. 2, the upper angular momentum generator 18 is absent. Instead of this, in this case there are provided, in a ray-shaped configuration in front of the aperture 34, guide ribs 41 the flank surfaces 42 of which decelerate the vortex in front of the aperture 34 and parallelize the gas flow relative to the geometric longitudinal axis 11. This also prevents the presence, behind the aperture 34, of a significant angular momentum which would fling the powder and/or the dust in an outward direction. Residues of an angular momentum may, of course, not be harmful. In addition to the mouth 36 and the conduit 37, a second conduit 43 together with mouth 44 is provided in the second illustrative embodiment. In this case, the vortex is generated by the inert gas blown in through the conduits 37 and 43, together with the shape of the interior space 38. It is now possible to blow in one type of powder and/or dust via the conduit 37, for example, and another using the conduit 43. Moreover, the concentration of these components may vary with the passage of time, resulting thus in differing mixing ratios of the dusts and/or powders. It may be useful at specific positions of the surface 16 to apply more of one of the components and at other positions more of the other component. In this way, there is a simple control. It is also possible to provide more than two blowing-in mouths.

Figure 3:
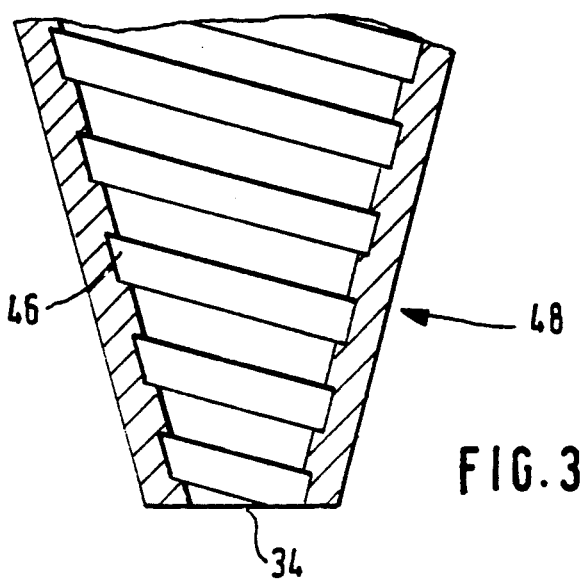
FIG. 3 shows the broken-away and cut-away elevation of the lower region of the device according to the invention, with a further passive angular momentum brake.

FIG. 3 shows a second passive momentum brake 48. In this case, coaxial grooves 46 are formed above the aperture 34, which grooves are directed opposite to the direction and movement of the vortex, so that in the aperture 34 the angular momentum is likewise zero or at least approximately zero. The representation in FIG. 3 is diagrammatic.

Figure 4:
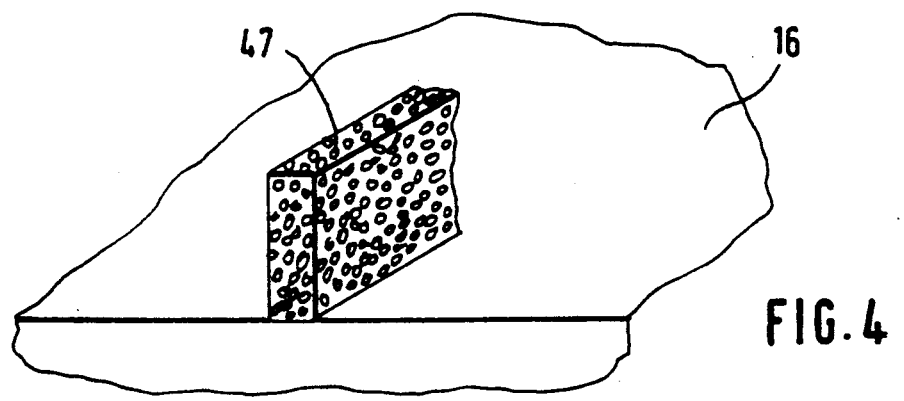
FIG. 4 shows the perspective diagrammatic elevation of a wall.

FIG. 4 shows a wall which can be built on the surface 16. Also shown are the individual powder grains 47 as they are seen under the microscope. The wall is approximately 0.5 mm wide and 3.5 mm high. The question of whether the powder is built up into a wall or flows away on the surface 16 is dependent upon easily adjustable operating parameters.

Typical inert gas throughputs are at levels of 0.05 to 1 m$^3$/h. Typical quantities of powder are 10 grams powder/min. If the choice is available, larger grain sizes are more suitable than smaller ones, since in this case the weight/surface ratio is greater and thus the efficiency of the powder utilisation becomes greater.

I claim:

1. Device for coating surfaces of materials using the energy of a power laser having a geometric longitudinal axis, in which a laser beam radiates, having a focal spot which is traversed by the geometric longitudinal axis and in the region of which a material to be processed can be arranged, and having a feeding device, by which powder can be brought into the region of the focal spot by means of a transport gas, wherein a) a head is arranged around the geometric longitudinal axis and in front of the focal spot, which head transmits the laser beam in the direction of the geometric longitudinal axis and has an entrance region and an exit region for the laser beam, b) the head has a central interior space arranged around the geometric longitudinal axis, c) in the exit region, the interior space has a coaxial aperture, which is slightly larger than the diameter of the laser beam, d) in the entrance region of the interior space there is provided at least one inlet nozzle for transport gas, which nozzle emits into the interior space, and e) the inlet nozzle is arranged with an at least predominantly tangential component relative to the interior space.

2. Device according to claim 1, wherein the interior space has oblique walls falling away towards the coaxial aperture.

3. Device according to claim 2, wherein at least in essential regions, the walls form a coaxial circular cone, the angle of which is greater than the angle of repose of the powder.

4. Device according to claim 1, wherein inlet nozzles are provided in a number corresponding to the types of component of the powder.

5. Device according to claim 1, wherein an angular momentum brake is provided for a vortex generated by the transport gas and the inlet nozzle is provided in the interior space.

6. Device according to claim 5, wherein the angular momentum brake has a setting in which the angular momentum in the coaxial aperture is in the region around zero.

7. Device according to claim 6, the angular momentum brake has a setting in which the angular momentum in the coaxial aperture is zero.

8. Device according to claim 5, wherein the angular momentum brake comprises gas guide surfaces at least in the region in front of the coaxial aperture.

9. Device according to claim 8, wherein the gas guide surfaces are the flanks of grooves.

10. Device according to claim 8, wherein the gas guide surfaces are the flanks of guide ribs.

11. Device according to claim 10, wherein the flanks extend parallel to the geometric longitudinal axis.

12. Device according to claim 10, wherein the flanks are arranged in a spiral contrary to the sense of the twist of the vortex caused by the angular momentum.

13. Device according to claim 5, wherein the angular momentum brake is an upstream angular momentum generator, the angular momentum of which is oppositely directed to the angular momentum of the device.

14. Device according to claim 1, comprising means for feeding powder of differing materials together with one another.

15. Device according to claim 14, wherein the materials are differing metals.

16. Device according to claim 15, wherein the materials are differing metal oxides.

17. Device according to claim 14, wherein the materials are plastic and ceramic.

18. Device according to claim 14, wherein the materials are metal and ceramic.

19. Device according to claim 14, wherein the materials are plastic and metal.

20. Device according to claim 14, wherein one of the materials predominates in relation to the other in terms of quantity.

21. Device according to claim 20, wherein one of the materials is greatly predominant in relation to the other.

22. Device according to claim 21, wherein more than two materials are fed together with one another.

23. Device according to claim 22, wherein hard metal powder and ceramic powder are mixed.

24. Device according to claim 10 wherein the flanks are arranged in a spiral in the same sense as the twist of the vortex caused by the angular momentum.

* * * * *